(12) United States Patent
Cho et al.

(10) Patent No.: US 11,069,899 B2
(45) Date of Patent: Jul. 20, 2021

(54) NEGATIVE ELECTRODE FOR SECONDARY BATTERY

(71) Applicant: LG CHEM, LTD., Seoul (KR)

(72) Inventors: Jin Hyun Cho, Daejeon (KR); Hyun Woong Yun, Daejeon (KR)

(73) Assignee: LG CHEM, LTD., Seoul (KR)

(*) Notice: Subject to any disclaimer, the term of this patent is extended or adjusted under 35 U.S.C. 154(b) by 61 days.

(21) Appl. No.: 16/099,549

(22) PCT Filed: Oct. 13, 2017

(86) PCT No.: PCT/KR2017/011346
§ 371 (c)(1),
(2) Date: Nov. 7, 2018

(87) PCT Pub. No.: WO2018/070843
PCT Pub. Date: Apr. 19, 2018

(65) Prior Publication Data
US 2019/0221854 A1 Jul. 18, 2019

(30) Foreign Application Priority Data

Oct. 14, 2016 (KR) .................. 10-2016-0133470
Oct. 11, 2017 (KR) .................. 10-2017-0129710

(51) Int. Cl.
*H01M 4/70* (2006.01)
*H01M 4/134* (2010.01)
(Continued)

(52) U.S. Cl.
CPC ............. *H01M 4/70* (2013.01); *H01M 4/134* (2013.01); *H01M 4/366* (2013.01); *H01M 4/382* (2013.01);
(Continued)

(58) Field of Classification Search
CPC ........ H01M 4/70; H01M 4/134; H01M 4/366; H01M 4/382; H01M 4/628; H01M 4/661; H01M 10/052; H01M 2004/027
See application file for complete search history.

(56) References Cited

U.S. PATENT DOCUMENTS

2006/0110661 A1* 5/2006 Lee .................. H01M 4/661
429/233
2012/0121983 A1 5/2012 Yoon et al.
(Continued)

FOREIGN PATENT DOCUMENTS

CN 100405640 C 7/2008
CN 104221188 A 12/2014
(Continued)

OTHER PUBLICATIONS

EPO machine generated English translation of KR-20130115607-A (Year: 2013).*
(Continued)

*Primary Examiner* — Christopher P Domone
*Assistant Examiner* — Kimberly Wyluda
(74) *Attorney, Agent, or Firm* — Birch, Stewart, Kolasch & Birch, LLP

(57) ABSTRACT

The present invention relates to a negative electrode for a secondary battery. The negative electrode for the secondary battery according to an embodiment of the present invention comprises a negative electrode collector and a negative electrode active material integrated with at least a portion of a surface of the negative electrode collector, wherein the negative electrode collector has a plurality of delamination prevention current collection grooves with which the negative electrode active material is integrated, and the negative electrode active material is disposed on an inner surface of each of the delamination prevention current collection grooves so that a space part in which a passivation layer is formed is defined during charging and discharging.

4 Claims, 6 Drawing Sheets

(51) Int. Cl.
  *H01M 4/66*    (2006.01)
  *H01M 10/052*  (2010.01)
  *H01M 4/02*    (2006.01)
  *H01M 4/38*    (2006.01)
  *H01M 4/36*    (2006.01)
  *H01M 4/62*    (2006.01)

(52) U.S. Cl.
  CPC ........... *H01M 4/628* (2013.01); *H01M 4/661* (2013.01); *H01M 10/052* (2013.01); *H01M 2004/027* (2013.01)

(56) References Cited

U.S. PATENT DOCUMENTS

| | | | | |
|---|---|---|---|---|
| 2014/0377604 A1* | 12/2014 | Tenzer | .............. | H01M 4/0473 429/61 |
| 2015/0037675 A1* | 2/2015 | Izuhara | .............. | H01M 4/134 429/221 |

FOREIGN PATENT DOCUMENTS

| | | | |
|---|---|---|---|
| JP | 2015-153713 | A | 8/2015 |
| KR | 2002-0059181 | A | 7/2002 |
| KR | 10-0582557 | B1 | 5/2006 |
| KR | 10-0582558 | B | 5/2006 |
| KR | 10-2012-0053180 | A | 5/2012 |
| KR | 10-1147410 | B1 | 5/2012 |
| KR | 20130115607 | A * | 10/2013 |
| KR | 10-2013-0125587 | A | 11/2013 |
| KR | 10-2014-0015647 | A | 2/2014 |
| KR | 10-2014-0070751 | A | 6/2014 |
| KR | 10-2014-0112597 | A | 9/2014 |
| KR | 10-2015-0000984 | A | 1/2015 |
| KR | 10-2015-0072107 | A | 6/2015 |

OTHER PUBLICATIONS

International Search Report (PCT/ISA/210) issued in PCT/KR2017/011346, dated May 23, 2018.

* cited by examiner

NEGATIVE ELECTRODE FOR SECONDARY BATTERY

CROSS-REFERENCE TO RELATED APPLICATION

The present application claims the benefit of the priority of Korean Patent Application Nos. 10-2016-0133470, filed on Oct. 14, 2016, and 10-2017-0129710, filed on Oct. 11, 2016, which are hereby incorporated by reference in their entirety.

TECHNICAL FIELD

The present invention relates to a negative electrode for a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Secondary batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

When a lithium metal is used for a negative electrode of a secondary battery, following problems may occur. The lithium metal has high reactivity with an electrolyte component. Thus, when the electrolyte and the lithium metal come into contact with each other, the electrolyte may be spontaneously decomposed to form a passivation layer on a surface of the lithium metal. The passivation layer may be delaminated and collapsed as continuous charging and discharging of the lithium metal battery proceeds. Thus, a passivation layer may be additionally generated in a gap generated by the above-described phenomenon to form so-called "dead lithium (Li)", thereby deteriorating lifespan characteristics of the battery. Also, when the delamination and the collapse of the passivation layer are repeated, a local difference in current density may occur to non-uniformly distribute current when the charging and discharging are performed and also to form lithium dendrite having a resin phase. Also, when the dendrite formed as described above is continuously grown to come into contact with the positive electrode by passing through the separator, internal short circuit may occur to cause explosion of the battery.

DISCLOSURE OF THE INVENTION

Technical Problem

One aspect of the present invention is to provide a negative electrode for a secondary battery, which is capable of minimizing a phenomenon in which a lifespan of the battery is reduced while the battery is charged and discharged.

Technical Solution

A negative electrode for a secondary battery according to an embodiment of the present invention comprises a negative electrode collector and a negative electrode active material integrated with at least a portion of a surface of the negative electrode collector, wherein the negative electrode collector has a plurality of delamination prevention current collection grooves with which the negative electrode active material is integrated, and the negative electrode active material is disposed on an inner surface of each of the delamination prevention current collection grooves so that a space part in which a passivation layer is formed is defined during charging and discharging.

Advantageous Effects

According to the present invention, the negative electrode active material may be integrated so that the space part in which the passivation layer is formed is formed in the delamination prevention current collection groove formed in the negative electrode to prevent the passivation layer from being delaminated. Therefore, the lifespan of the battery may be prevented from being reduced.

Particularly, the passivation layer made of the lithium metal and formed on the surface of the negative electrode active material through the charging and discharging may be supported by the inner wall of the delamination prevention current collection groove to prevent the passivation layer from being delaminated. Thus, when the charging and discharging are repeated, the collapse and generation of the passivation layer may be prevented from being repeated. Therefore, the dead lithium, which is non-uniformly grown as the collapse and generation of the passivation layer is repeated, may be prevented from being generated. As a result, the increase in resistance of the cell and the deterioration in cycle efficiency may be prevented. In addition, as the dendrite is prevented from being continuously grown, the short circuit may be prevented from occurring because the dendrite comes into contact with the positive electrode by passing through the separator, thereby preventing the battery from being exploded due to the internal short circuit.

MODE FOR CARRYING OUT THE INVENTION

Figure 1:
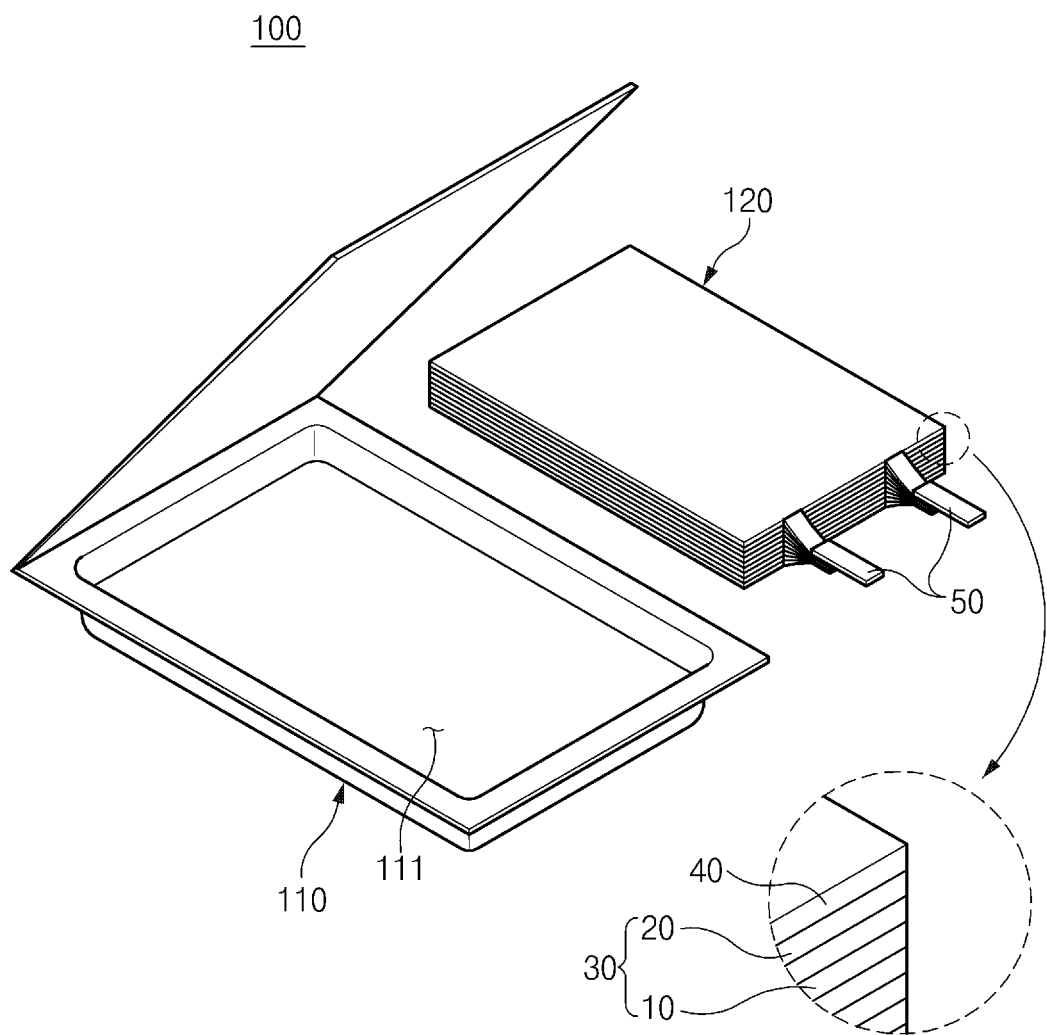
FIG. 1 is an exploded perspective view of a secondary battery to which a negative electrode for the secondary battery is applied according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
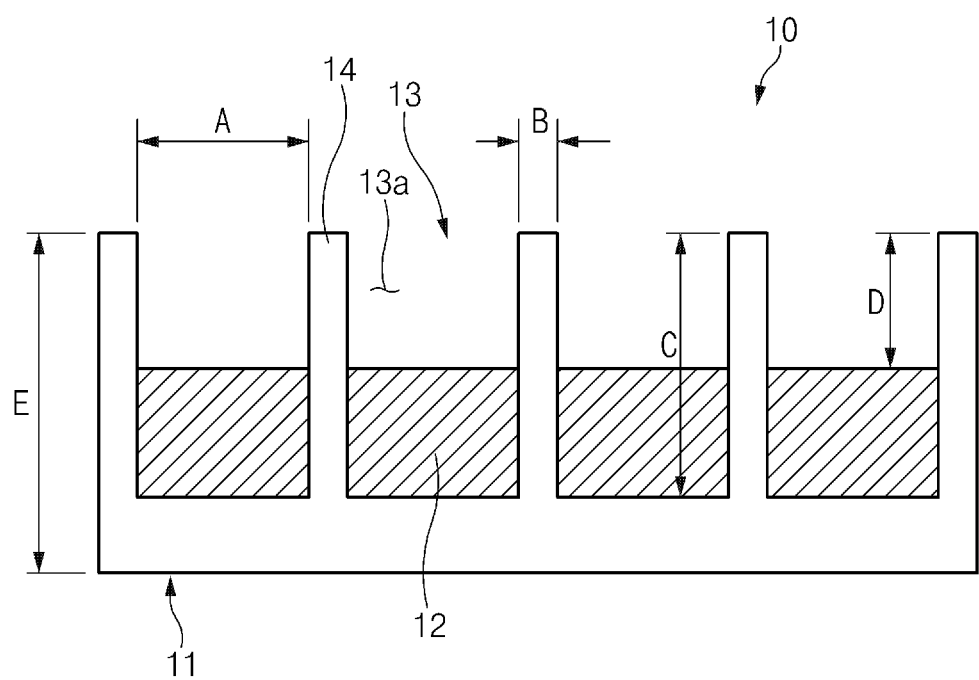
FIG. 2 is a partial cross-sectional view of the negative electrode for the secondary battery according to an embodiment of the present invention.

FIG. 1 is an exploded perspective view of a secondary battery to which a negative electrode for the secondary battery is applied according to an embodiment of the present invention, and FIG. 2 is a partial cross-sectional view of the negative electrode for the secondary battery according to an embodiment of the present invention.

Referring to FIGS. 1 and 2, a negative electrode 10 for a secondary battery according to an embodiment of the present invention comprises a negative electrode collector 11 and a negative electrode active material 12 integrated with the negative electrode collector 11.

Hereinafter, the negative electrode for the secondary battery according to an embodiment of the present invention will be described in more detail with reference to FIGS. 1 to 5.

Referring to FIG. 1, the secondary battery 100 to which the negative electrode for the secondary battery according to an embodiment of the present invention is applied comprises an electrode assembly 120 and a battery case 110 comprising an accommodation part 111 accommodating the electrode assembly 120.

The electrode assembly 120 may be a chargeable and dischargeable power generation element and have a structure in which an electrode 30 and a separator 40 are combined and alternately stacked.

The electrode 30 may comprise a positive electrode 20 and a negative electrode 10. Here, the electrode assembly 120 may have a structure in which the positive electrode 20/the separator 40/the negative electrode 10 are alternately stacked. Here, the separator 40 may be disposed between the positive electrode 20 and the negative electrode 10 and disposed outside the positive electrode 20 and outside the negative electrode 10. Here, the separator 40 may be disposed to surround the entire electrode assembly 110 in which the positive electrode 20/the separator 40/the negative electrode 10 are stacked.

The separator 40 is made of an insulation material to electrically insulate the positive electrode 20 from the negative electrode 10. Here, the separator 40 may be made of, for example, a polyolefin-based resin film such as polyethylene or polypropylene having micropores.

The electrode assembly 100 may comprise an electrode lead 50. Here, the electrode lead 50 may be electrically connected to a side surface of the electrode 30.

Figure 3:
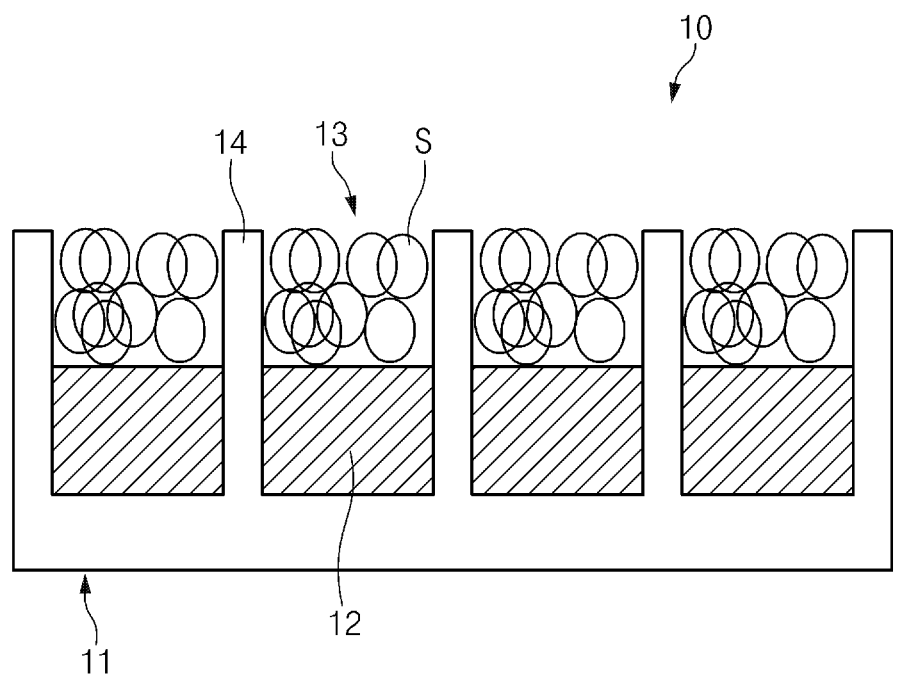
FIG. 3 is a partial cross-sectional view illustrating a state in which a mass diffusion layer is disposed on the negative electrode for the secondary battery according to an embodiment of the present invention.

FIG. 3 is a partial cross-sectional view illustrating a state in which a passivation layer is disposed on the negative electrode for the secondary battery according to an embodiment of the present invention.

In more detail, referring to FIGS. 2 and 3, the negative electrode 10 may comprise a negative electrode collector 11 and a negative electrode active material 12 integrated with the negative electrode collector 11.

The negative electrode collector 11 may be made of, for example, foil comprising a copper (Cu) material.

Also, the negative electrode collector 11 may have a plurality of delamination prevention current collection groove 13 with which the negative electrode active material 12 is integrated.

The negative electrode active material 12 may be integrated with at least a portion of a surface of the negative electrode collector 11.

Furthermore, the negative electrode active material 12 may be made of, for example, a lithium (Li) metal material.

Also, the negative electrode active material 12 may be disposed on an inner surface of the delamination prevention current collection groove 13 so that a space part 13a in which a passivation layer S is formed is defined in the delamination prevention current collection groove 13 while the charging and charging are performed. Here, the passivation layer may be a solid electrolyte interphase (SEI).

Particularly, the negative electrode active material is disposed at a lower portion of the delamination prevention current collection groove 13, and the space part 13a may be defined in a portion except for the portion, at which the negative electrode active material 12 is disposed, in the delamination prevention current collection groove 13. Thus, the passivation layer S formed in the space part 13a of the delamination prevention current collection groove 13 during the charging and discharging may be supported to be prevented from being delaminated by the inner surface of the delamination prevention current collection groove 13. That is, both sides of the passivation layer S may be supported by an inner wall 14, which is disposed on an inner side surface of the delamination prevention current collection groove 13, to prevent the passivation layer S from being delaminated. As a result, the passivation layer S disposed on the surface of the negative electrode active material 12 may serve as a kinetic barrier that prevents reduction reaction from being further occurring to significantly preventing or reducing the reduction in lifespan of the battery. Particularly, dead lithium that is generated by repeating collapse and generation of the passivation layer S and a porous layer may be stacked to prevent a cell from increasing in resistance and prevent a cycle lifespan from being reduced.

In the negative electrode for the secondary battery according to an embodiment of the present invention, the passivation layer S may be disposed on an outer surface of the negative electrode active material 12 formed in the delamination prevention current collection groove 13. Thus, the passivation layer S may be disposed on the outer surface of the negative electrode active material 12 from an initial stage of the charging and discharging to more effectively prevent the lifespan of the battery from being reduced.

In the negative electrode for the secondary battery according to an embodiment of the present invention, when a width of the delamination prevention current collection groove 13 is A, and a distance between the delamination prevention current collection grooves 13 is B, the following conditional expression may be satisfied.

$$0.5 < A/B < 10 \quad (1)$$

When a value is less than that in a range satisfying the conditional expression (1) (i.e., a value of A/B is less than 0.5), the side surface of the negative electrode collector 11 may be deteriorated in flexibility. That is, when the passivation layer S is contracted and expanded during the charging and discharging while the inner wall 14 of the delamination prevention current collection groove 13 defined in the negative electrode collector 11 is deteriorated in flexibility, the inner wall 14 may not be contracted and expanded to deteriorate an effect of the side surface of the passivation layer S.

Also, when a value is greater than that in a range satisfying the conditional expression (1) (i.e., a value of A/B is greater than 10), it is impossible to serve as a support due to a limitation in strength of the negative electrode collector 11 on the side surface of the passivation layer S. That is, the inner wall 14 of the delamination prevention current collection groove 13 defined in the negative electrode collector 11 may be reduced in strength to deteriorate a supporting effect of the inner wall 14.

In the negative electrode for the secondary battery according to an embodiment of the present invention, when a depth of the delamination prevention current collection groove 13 is C, and the total thickness of the negative electrode collector 11 is E, the following conditional expression may be satisfied.

$$0.2 < C/E < 0.8 \quad (2)$$

When a value is less than that in a range satisfying the conditional expression (2) (i.e., the value of C/E is less than 0.2), toughness of the passivation layer S due to a variation in volume of the passivation layer S may be deteriorated due to the deterioration in flexibility of the negative electrode collector 11. That is, when the side surface of the delamination prevention current collection groove 13 defined in the negative electrode collector 11 is deteriorated in flexibility, the toughness of the passivation layer S due to the variation in volume of the passivation layer S, which is contracted and expanded during the charging and discharging may be deteriorated. Thus, the passivation layer S may be delaminated from and collapsed on the surface of the negative electrode collector 11 of the lithium metal.

Also, when a value is greater than that in a range satisfying the conditional expression (2) (i.e., the value of C/E is greater than 0.8), the negative electrode collector 11 may have problems in processing and resistance.

In the negative electrode for the secondary battery according to an embodiment of the present invention, when a depth of the space part 13a of the delamination prevention current collection groove 13 is D, the following conditional expression may be satisfied.

$$0.05 \text{ um} < D \quad (3)$$

When a value is less than that in a range satisfying the conditional expression (3) (i.e., the depth D is less than 0.05 um), the negative electrode collector 11 may not sufficiently serve as a lateral support when the passivation layer S is grown to cause the delamination of the passivation layer S. That is, the inner wall 14 of the delamination prevention current collection groove 13 may not sufficiently serve as the lateral support of the passivation layer S.

In the negative electrode for the secondary battery according to an embodiment of the present invention, when a width of the delamination prevention current collection groove 13 is A, a distance between the delamination prevention current collection grooves 13 is B, and a depth of the delamination prevention current collection groove 13 is C, the following conditional expression may be satisfied.

$$1 \text{ um} < A < 1{,}000 \text{ um}, 10 \text{ um} < B < 1{,}000 \text{ um, and } 10 \text{ um} < C < 1{,}000$$

Here, particularly, the negative electrode for the secondary battery according to an embodiment of the present invention may satisfy, for example, the following conditional expression: 10 um <A <100 um, 10 um <B <100 um, and 10 um <C <100 um.

Here, more particularly, the negative electrode for the secondary battery according to an embodiment of the present invention may satisfy, for example, the following conditional expression: 20 um <A <60 um, 20 um <B <60 um, and 20 um <C <60 um.

As described above, in the negative electrode 10 for the secondary battery according to an embodiment of the present invention, the copper (Cu) negative electrode collector 11 on which the pattern is formed may be used to adjust the passivation layer to decrease in size and also to form a support of the passivation layer S, thereby suppressing the delamination and collapse of the delamination layer S to form the more stable delamination layer S. This phenomenon may suppress side reaction between the negative electrode active material 12 comprising the lithium metal and the electrolyte to uniformly distribute current, thereby suppressing nonuniform growth of the dendrite and minimizing generation of the dead lithium.

Also, when the stable passivation layer S is formed, the secondary battery may be improved in performance as disclosed in the treatise published by Jianming Zheng's [Highly Stable Operation of Lithium Metal Batteries Enabled by the Formation of a Transient High-Concentration Electrolyte Layer (2016)]. That is, in the state in which the passivation layer S is delaminated and collapsed, and the passivation layer S, in which the grown dead lithium is minimized, is formed, the more a cycle proceeds, the more a degree of degrade of a battery capacity may be minimized to maintain the battery capacity.

Embodiments 1 to 10, Comparative Example 1

When a width of the delamination prevention current collection groove 13 is A, a distance between the delamination prevention current collection grooves 13 is B, and a depth of the delamination prevention current collection groove 13 is C, the lithium secondary batteries were constructed under the conditions shown in Table below.

TABLE 1

| | C (Unit um) | A (Unit um) | B (Unit um) |
|---|---|---|---|
| Embodiment 1 | 20 | 20 | 20 |
| Embodiment 2 | 40 | 40 | 40 |
| Embodiment 3 | 60 | 60 | 60 |
| Embodiment 4 | 40 | 20 | 60 |
| Embodiment 5 | 10 | 10 | 10 |
| Embodiment 6 | 100 | 100 | 100 |
| Embodiment 7 | 200 | 200 | 200 |
| Embodiment 8 | 500 | 500 | 500 |

TABLE 1-continued

| | C (Unit um) | A (Unit um) | B (Unit um) |
|---|---|---|---|
| Embodiment 9 | 1000 | 1000 | 1000 |
| Embodiment 10 | 5000 | 5000 | 5000 |
| Comparative Example 1 (No formation of delamination prevention current collection groove) | 0 | 0 | 0 |

<Experimental Example>

Expression capacities and capacity maintenance rates when the patterns of Table 1 are applied were shown in Table 2 below. Also, a cell in which nickel cobalt manganese (NCM) is used as the positive electrode active material, lithium metal is used as the negative electrode active material, a PE separator is provided as the separator, and ethylene carbonate/ethyl methyl carbonate/dimethyl carbonate (EC/EMC/DMC) 1 M LiPF6 VC 0.5 wt % is used as the electrolyte were manufactured to be evaluated.

TABLE 2

| | Expression Capacity (mAh) | Capacity maintenance rate (%), 200th cycle |
|---|---|---|
| Embodiment 1 | 5.25 | 88.57 |
| Embodiment 2 | 5.24 | 86.65 |
| Embodiment 3 | 5.26 | 84.15 |
| Embodiment 4 | 5.28 | 86.57 |
| Embodiment 5 | 5.28 | 70.57 |
| Embodiment 6 | 5.28 | 76.57 |
| Embodiment 7 | 5.28 | 56.57 |
| Embodiment 8 | 5.28 | 46.57 |
| Embodiment 9 | 5.29 | 35.78 |
| Embodiment 10 | 5.21 | 25.23 |
| Comparative Example 1 | 5.24 | 20.46 |

As shown in Table 2 above, when comparing the capacity maintenance rates according to Embodiments 1 to 10, in which the delamination prevention current collection groove 13 is formed, with the capacity maintenance rate according to Comparative Example 1, in which the delamination prevention current collection groove is not formed, and thus a pattern is not provided, it is seen that the cycle performance is superior when the delamination prevention current collection groove 13 is formed.

Here, it is seen that the capacity maintenance rates according to Embodiments 1 to 8, in which the delamination prevention current collection groove 13 is formed with a pattern having a size of 1000 um or less, is greater than that according to Comparative Example 1 in which the delamination prevention current collection groove 13 is not formed, and thus a pattern is not provided.

Here, it is seen that the capacity maintenance rates according to Embodiments 1 to 6, in which the delamination prevention current collection groove 13 is formed with a pattern having a size of 10 um to 100 um, is significantly greater than that according to Comparative Example 1 in which the delamination prevention current collection groove 13 is not formed, and thus a pattern is not provided.

Particularly, in case of Embodiments 1 to 4, in which the delamination prevention current collection groove 13 is provided as a pattern having a size of 20 um to 60 um, it is seen that the capacity maintenance rate is remarkably superior even after 200 cycles elapse.

Figure 4:
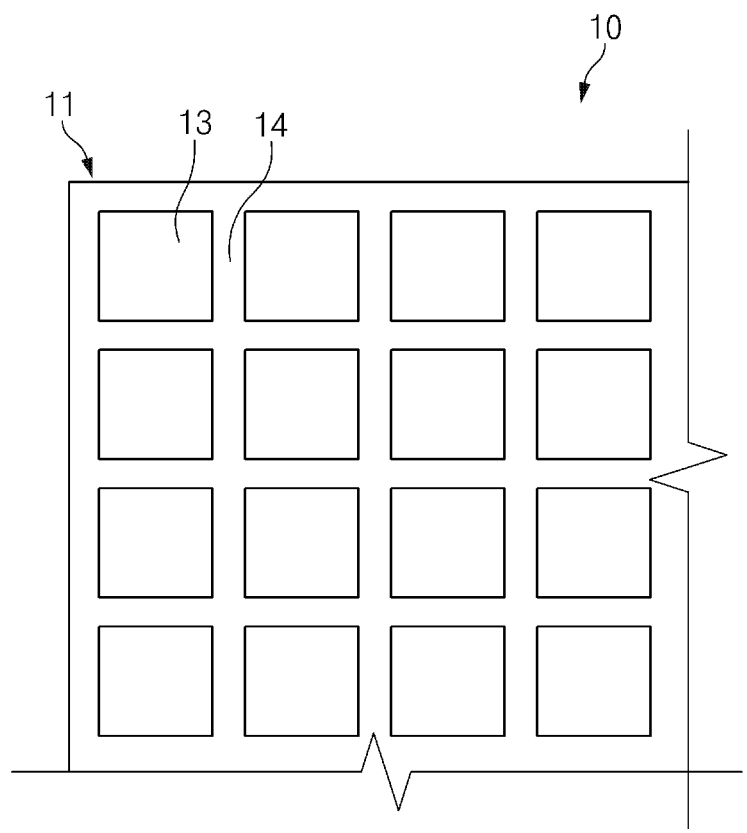
FIG. 4 is a partial plan view illustrating an example of the negative electrode for the secondary battery according to an embodiment of the present invention.
Figure 5:
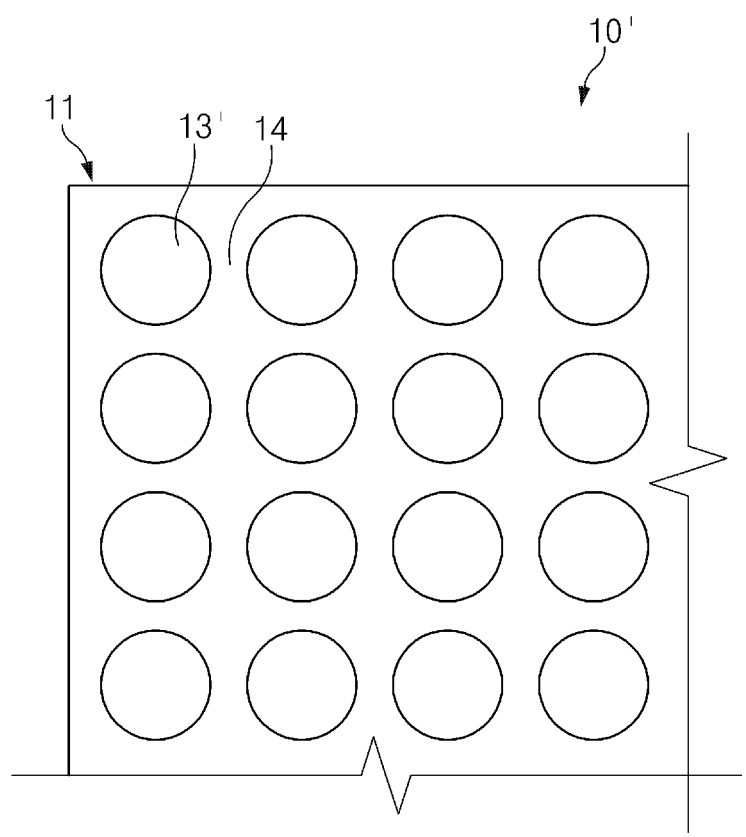
FIG. 5 is a partial plan view illustrating another example of the negative electrode for the secondary battery according to an embodiment of the present invention.

FIG. 4 is a partial plan view illustrating an example of the negative electrode for the secondary battery according to an embodiment of the present invention, and FIG. 5 is a partial plan view illustrating another example of the negative electrode for the secondary battery according to an embodiment of the present invention.

Referring to FIG. 4, in the negative electrode 10 for the secondary battery according to an embodiment of the present invention, the delamination prevention current collection groove 13 may have, for example, a rectangular shape.

Also, referring to FIG. 5, in a negative electrode 10' for a secondary battery according to an embodiment of the present invention, a delamination prevention current collection groove 13' may have, for another example, a circular shape.

Figure 6:
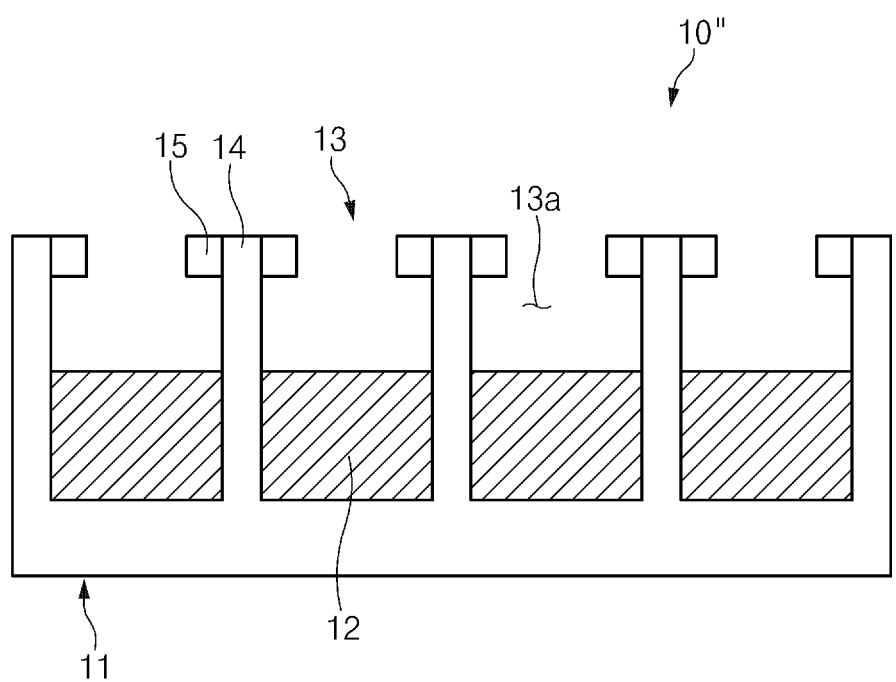
FIG. 6 is a partial cross-sectional view of a negative electrode for a secondary battery according to another embodiment of the present invention.

FIG. 6 is a partial cross-sectional view of a negative electrode for a secondary battery according to another embodiment of the present invention.

Referring to FIG. 6, in a negative electrode 10" for a secondary battery according to another embodiment of the present invention, a separation prevention part 15 may be further provided in a negative electrode collector 11.

The separation prevention part 15 may be disposed on an upper end of a delamination prevention current collection groove 13 of the negative electrode collector 11 to protrude, thereby preventing the passivation layer S (see FIG. 3) from being separated from being separated from the delamination prevention current collection groove 13. That is, the separation prevention part 15 may extend from an upper end of an inner wall 14 of the negative electrode collector 11 to a space part 13a of the delamination prevention current collection groove 13 to hole an upper side surface of the passivation layer S, thereby preventing the passivation layer S from being separated from the delamination prevention current collection groove 13.

For example, the separation prevention part 15 may have a shape protruding or stepped in a direction in which the separation prevention part 15 faces the upper end of the delamination prevention current collection groove 13.

While the present invention has been particularly shown and described with reference to exemplary embodiments thereof, it is to be understood that the scope of the present invention is not limited to the negative electrode for the secondary battery according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A negative electrode for a secondary battery comprising:
    a negative electrode collector; and
    a negative electrode active material,
    wherein the negative electrode collector has a plurality of delamination prevention current collection grooves with which the negative electrode active material is integrated,
    wherein the negative electrode active material is disposed on an inner surface of each of the delamination prevention current collection grooves, and
    wherein a passivation layer is formed in a plurality of spaces during charging and discharging of the secondary battery, each space being defined by a respective delamination prevention current collection groove,
    wherein the negative electrode active material is disposed on a bottom portion of the inner surface of each of the delamination prevention current collection grooves, wherein each space is defined in the respective delamination prevention current collection groove except for a portion at which the negative electrode active material is disposed, wherein the passivation layer formed in each space of the respective delamination prevention current collection groove during the charging and discharging is supported by the inner wall of the respective delamination prevention current collection groove to prevent the passivation layer from being delaminated, wherein, when a width of each delamination prevention current collection groove is A, and a distance between the plurality of delamination prevention current collection grooves is B, a following conditional expression is satisfied: 0.5<AB<10, wherein, when a width of each delamination prevention current collection groove is A, a distance between the plurality of delamination prevention current collection grooves is B, and a depth of each delamination prevention current collection groove is C, a following conditional expression is satisfied: 20 μm<A<60 μm, 20 μm<B<60 μm, and 20 μm<C<60 μm, wherein, when a total thickness of the negative electrode collector is E, a following conditional expression is satisfied: 0.2<C/E<0.8, wherein, when a depth of each space of the respective delamination prevention current collection groove is D, a following conditional expression is satisfied: 0.05 μm<D, and wherein the negative electrode collector is made of copper (Cu).

2. The negative electrode of claim 1, wherein the negative electrode active material is made of a lithium metal.

3. The negative electrode of claim 1, wherein the passivation layer is disposed on an outer surface of the negative electrode active material.

4. The negative electrode of claim 1, wherein the negative electrode collector further comprises a separation prevention part protruding from an upper end of each delamination prevention current collection groove to prevent the passivation layer from being separated from the respective delamination prevention current collection groove.

* * * * *